(No Model.)

F. M. WHEELER.
PUMP REGULATING DEVICE.

No. 360,071. Patented Mar. 29, 1887.

Witnesses
Chas. H. Smith
J. Staul

Inventor
Frederick M. Wheeler
for Lemuel W. Serrell
atty

UNITED STATES PATENT OFFICE.

FREDERICK M. WHEELER, OF MONTCLAIR, N. J., ASSIGNOR TO THE GEO. F. BLAKE MANUFACTURING COMPANY, OF BOSTON, MASSACHUSETTS.

PUMP-REGULATING DEVICE.

SPECIFICATION forming part of Letters Patent No. 360,071, dated March 29, 1887.

Application filed March 19, 1886. Serial No. 195,799. (No model.)

*To all whom it may concern:*

Be it known that I, FREDERICK MERIAM WHEELER, of Montclair, in the county of Essex and State of New Jersey, have invented an Improvement in Pump-Regulating Devices, of which the following is a specification.

Pumps have been made for supplying water into a boiler, and a float has been used either in the boiler, to bring into action the pump when the water-level descends too low, or else such float has been in a vessel receiving the water of condensation from a coil-radiator, steam-jacket, or other article, to bring into action the pump when the water has accumulated to the desired level.

In all instances where a float is made use of with steam or water under pressure there is danger of the float becoming inoperative, in consequence of filling or partially filling with liquid should there be any leakage.

In cases where hollow floats have been connected by tubular arms to the hollow axis there is risk of the water remaining in the float and the float sinking below the axis and becoming inoperative. I provide stops that limit the downward movement of the float, so that any water passing into the float will run out and the float remain operative.

Figure 1:
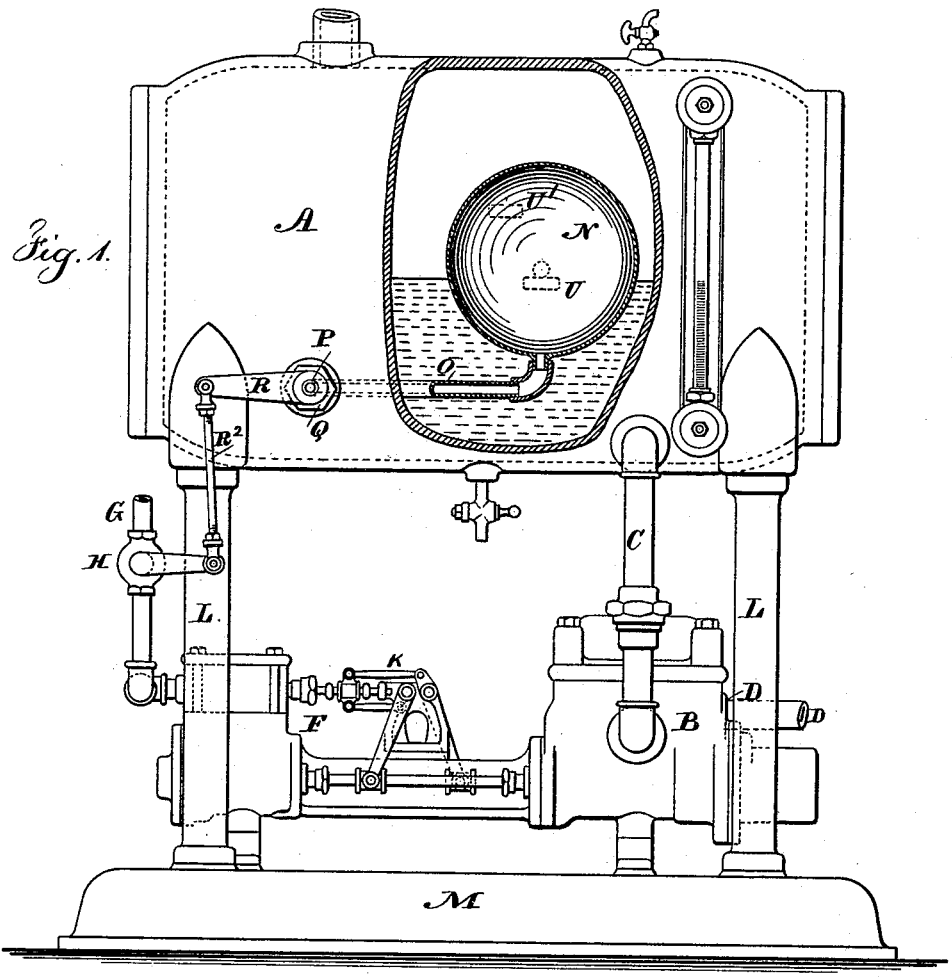
Figure 2:
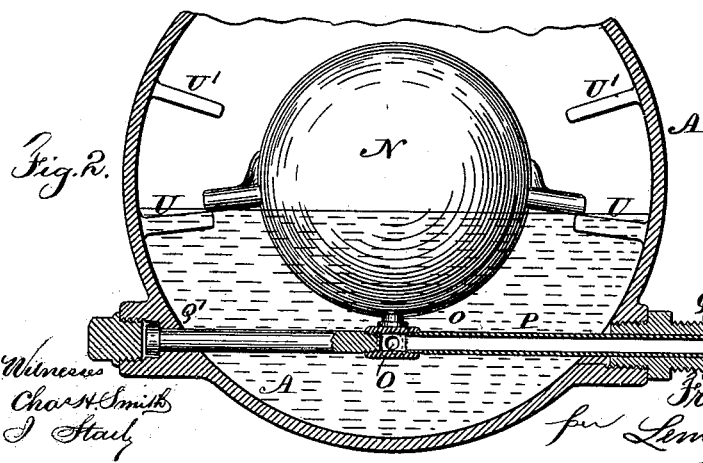

In the drawings, Figure 1 is a side view, partially in section, showing my improvement; and Fig. 2 is a vertical section, in larger size, through the axis of the float and the vessel containing such float.

The water-holding vessel A is adapted to receive the water of condensation from a condenser, or from steam-jackets or radiator-coils; or this vessel A may be a steam-boiler, or a part of a steam-boiler, that is to be supplied with water.

The pump B is preferably direct-acting, and it is provided with valves of ordinary character, (not shown,) and with pipes C D for the induction and eduction. The engine F is supplied by the pipe G and cock or valve H with steam from a boiler. The valve-moving devices K are of any desired kind, and are herein shown as direct-acting. The water-vessel A is supported by the columns L above the bed M of the engine and pump. The float N is within the vessel A, at the end of the hollow arm O, that extends out laterally from the hollow axis P, that passes through the stuffing-box or gland Q, at one side of the vessel A, and this axis P is supported in a bearing, Q', at its inner end. Upon the outer end of the axis P there is an arm, R, and link R² to the cock H.

If the improvement is applied to the discharge of water of condensation from the vessel A, the pipe C will be the induction to the pump and the pipe D the discharge; but if the vessel A is the boiler, or a part of the boiler to be supplied with water, the pipe D will be the induction and the pipe C the discharge into such boiler.

If the vessel A receives the water of condensation, then the float N will act to admit steam as the float rises, so as to drive the pump more rapidly. If the vessel A is supplied with water from the pump, then the opening in the cock H is in the opposite position to the float, so that the steam is partially and then entirely shut off by the rise of water in the vessel A.

The hollow arm O is permanently connected to the bottom of the float N, and opens into the same, and the hollow arm O opens into the tubular axis P, so that if there is any leakage of steam or water into the float N the same passes out at the open exterior end of the axis P to the atmosphere, and this prevents any accumulation in the said float, as well as indicates immediately that the float requires to be repaired.

I make use of one or more stops, U, within the vessel A, to limit the downward movement of the float, and this stop is preferably in such a position that the hollow arm O shall be level, or nearly so, in order that water may not lodge in such hollow arm should the float leak. The float, however, can rise, and there may be a stop, U', to limit the upward movement.

My apparatus is compact and reliable, and it is not liable to get out of order, and in case the hollow metal float is injured no bad results can follow, because the water will discharge itself from the float.

I claim as my invention—

The combination, with the vessel A, of a hollow float within such vessel, a hollow arm connected to the lower part of such float and opening into the same, a tubular axis to which the hollow arm is connected, a gland through which passes the tubular axis, and a stop to determine the downward movement of such float, substantially as set forth.

Signed by me this 13th day of March, A. D. 1886.

FREDK. M. WHEELER.

Witnesses:
HAROLD SERRELL,
WILLIAM G. MOTT.